(12) United States Patent
Xiao et al.

(10) Patent No.: US 10,281,052 B2
(45) Date of Patent: May 7, 2019

(54) VALVE STEM AND VALVE CORE ASSEMBLY AND VALVE COMPRISING THE ASSEMBLY

(71) Applicant: EMERSON PROCESS MANAGEMENT REGULATOR TECHNOLOGIES, INC., McKinney, TX (US)

(72) Inventors: Xiao Xiao, Chengdu (CN); Ping Huo, Chengdu (CN)

(73) Assignee: EMERSON PROCESS MANAGEMENT REGULATOR TECHNOLOGIES, INC., McKinney, TX (US)

( * ) Notice: Subject to any disclaimer, the term of this patent is extended or adjusted under 35 U.S.C. 154(b) by 11 days.

(21) Appl. No.: 14/437,825

(22) PCT Filed: Oct. 22, 2013

(86) PCT No.: PCT/CN2013/085703
§ 371 (c)(1),
(2) Date: Apr. 22, 2015

(87) PCT Pub. No.: WO2014/063616
PCT Pub. Date: May 1, 2014

(65) Prior Publication Data
US 2015/0276078 A1   Oct. 1, 2015

(30) Foreign Application Priority Data

Oct. 22, 2012  (CN) .................... 2012 2 0565976 U

(51) Int. Cl.
*F16K 1/48*   (2006.01)
*F16K 27/00*  (2006.01)
(Continued)

(52) U.S. Cl.
CPC ............. *F16K 27/00* (2013.01); *F16K 1/48* (2013.01); *F16K 1/487* (2013.01); *F16K 1/34* (2013.01); *F16K 1/46* (2013.01)

(58) Field of Classification Search
CPC ... F16K 1/48; F16K 1/487; F16K 1/34; F16K 1/36; F16K 1/482; F16K 1/485; F16K 1/46
(Continued)

(56) References Cited

U.S. PATENT DOCUMENTS

| 2,886,283 | A | * | 5/1959 | Natho | F16K 1/42 |
| | | | | | 251/175 |
| 4,235,416 | A | * | 11/1980 | LaCoste | F16K 1/482 |
| | | | | | 251/86 |
| 4,674,530 | A | * | 6/1987 | Bickford | B65D 90/32 |
| | | | | | 137/469 |
| 6,213,447 | B1 | * | 4/2001 | Bircann | F16K 1/48 |
| | | | | | 251/84 |

(Continued)

FOREIGN PATENT DOCUMENTS

| CN | 2155471 Y | 2/1994 |
| CN | 2455965 Y | 10/2001 |

(Continued)

OTHER PUBLICATIONS

Search Report for PCT/CN2013/085703, dated Jan. 30, 2014.
Written Opinion for PCT/CN2013/085703, dated Jan. 30, 2014.

*Primary Examiner* — Marina A Tietjen
*Assistant Examiner* — Paul J Gray
(74) *Attorney, Agent, or Firm* — Marshall, Gerstein & Borun LLP

(57) ABSTRACT

A valve stem and valve core assembly and a valve including a valve stem and valve core assembly. The valve stem and valve core assembly includes a valve stem and a valve core that sleeves the valve stem. The assembly includes an
(Continued)

adjusting device arranged on the valve stem, and an elastic element arranged between the adjusting device and the valve core. A clearance exists between the valve core, the valve stem, and the adjusting device, so that the valve core can move relative to the valve stem, such that the valve can have a good closing performance.

20 Claims, 2 Drawing Sheets

(51) Int. Cl.
*F16K 1/46* (2006.01)
*F16K 1/34* (2006.01)

(58) Field of Classification Search
USPC .................................................. 251/321, 324
See application file for complete search history.

(56) References Cited

U.S. PATENT DOCUMENTS

| | | | |
|---|---|---|---|
| 6,736,162 B2 * | 5/2004 | Schimnowski | F16K 1/46 137/541 |
| 2003/0188784 A1 * | 10/2003 | Schimnowski | F16K 1/46 137/541 |
| 2004/0155219 A1 * | 8/2004 | McCarty | F16B 7/0426 251/357 |
| 2009/0146096 A1 * | 6/2009 | Davies, Jr. | F16K 1/48 251/333 |

FOREIGN PATENT DOCUMENTS

| | | | | |
|---|---|---|---|---|
| CN | 201636340 U | 11/2010 | | |
| CN | 203176393 U | 9/2013 | | |
| GB | 570317 A | * | 7/1945 | F16K 1/487 |

* cited by examiner

VALVE STEM AND VALVE CORE ASSEMBLY AND VALVE COMPRISING THE ASSEMBLY

TECHNICAL FIELD

The present disclosure relates to a valve stem and valve core assembly and a valve including a valve stem and valve core assembly.

BACKGROUND ART

A valve is a control device of a fluid pipeline. Its basic functions are to connect and cut off the circulation of a medium in the pipeline, change the circulation of the medium, change the flowing direction of the medium, and adjust the pressure or flow of the medium, so as to protect the normal operation of equipment on the pipeline. With the continuous development of modern industry, in view of the demands in aspects of petroleum, chemical industry, power stations, metallurgy, ships, nuclear energy and space navigation, higher requirements are put forward to valves and the demands are continuously increased. For one modern petrochemical plant, approximate ten thousand various valves are needed. As a result, and because valves are frequently opened and closed, the valves need to have good closing performance. Otherwise, evaporation, emission, and drip and leakage may easily occur, product quality may be low, energy consumption is increased, equipment corrodes, material consumption is increased, the environment may be polluted, and even accidents, resulting in, for example, shutdown, may happen.

At present, for most valves, in order to realize the closing function, a valve stem and a valve core need to be connected together. The valve stem drives the valve core to enable the valve core to seal the valve port. Usually, the valve stem and the valve core are fixedly connected together through threads or other manners, and these connecting manners do not allow relative movement between the valve core and the valve stem. However, in order to enable the valve to have a good closing performance, the valve core and the valve port need to be precisely fit. In order to solve this contradiction, during the production of valves, usually a method with higher machining precision and tolerance fit quality needs to be adopted. However, the effect of this method is common and the cost is higher.

BRIEF SUMMARY

The present invention is generally directed to a valve stem and valve core assembly and a valve including such an assembly, and enables the valve to have a good closing performance without increasing the machining precision.

In accordance with a first exemplary aspect of the present invention, a valve stem and valve core assembly is provided that includes a valve stem and a valve core that sleeves the valve stem. The assembly also includes an adjusting device that sleeves the valve stem. The adjusting device is located on one side of the valve core and the assembly further includes an elastic element arranged between the adjusting device and the valve core.

In one preferred form, the adjusting device or the valve core of the valve stem and valve core assembly is provided with a first groove and the elastic element is fitted in the first groove.

In another preferred form, the adjusting device of the valve stem and valve core assembly includes a convex part in contact with the valve stem and the valve core, and the valve core includes a concave part fitted in the concave part. The valve core and the convex part can be concentrically fitted.

In another preferred form, the valve core includes a convex part arranged in contact with the valve stem and the adjusting device, and the adjusting device includes a concave part fitted in the concave part. The adjusting device and the convex part can be concentrically fitted.

In another preferred form, the first groove of the valve stem and valve core assembly is a continuous annular groove which surrounds the valve stem, and the elastic element, which is placed in the annular groove, is an O-ring.

In another preferred form, the first groove of the valve stem and valve core assembly is a multi-section groove which surrounds the valve stem.

In another preferred form, the adjusting device or the valve core of the valve stem and valve core assembly is provided with a plurality of grooves and the elastic element is fitted with the plurality of grooves.

In another preferred form, the adjusting device of the valve stem and valve core assembly is fixed on the valve stem by a nut.

In another preferred form, an inner wall of the adjusting device is provided with a thread and the adjusting device can be screwed and fixed onto the valve stem by the thread on the inner wall.

The valve stem and valve core assembly according to the first exemplary aspect provides a clearance between the valve core, the valve stem and the adjusting device. This enables the valve core to move relative to the valve stem. The elastic element can further adjust the clearance between the valve core and the valve stem. As such, the valve core can more flexibly move relative to the valve stem, thereby enabling the valve to have a good closing performance.

In accordance with a second exemplary aspect of the present invention, a valve is provided that includes a valve port and a valve stem and valve core assembly. The assembly includes a valve stem, a valve core sleeving the valve stem, an adjusting device sleeving the valve stem, and an elastic element arranged between the adjusting device and the valve core. One end of the valve stem and the valve core are arranged in the valve port. The valve core is movable relative to the valve port responsive to movement of the valve stem. The valve core is configured to sealingly contact the valve port to close the valve port.

In one preferred form, the valve core of the valve can be a piston or a clack valve.

The valve constructed according to the second exemplary aspect operates so that when the valve port is closed, the valve core can flexibly move relative to the valve stem, thereby enabling the valve core to fully fit with the valve port. This does not require higher machining accuracy of the valve core and the valve port, yet a good closing performance can be achieved and the cost can be reduced.

DETAILED DESCRIPTION OF THE DRAWINGS

The following will describe the preferable embodiments with reference to the drawings which constitute one part of the present invention. The attached drawings illustrate the specific embodiments for achieving the present invention by way of example. The illustrated embodiments are not intended to limit all of the embodiments of the present invention. It may be appreciated that without departing from the scope of the present invention, other embodiments may be used, or some structural or logical changes may be possible. Therefore, the following specific explanations are not meant as a limitation of the present invention, and the scope of the present invention is defined by the attached claims.

Example 1

Figure 1:
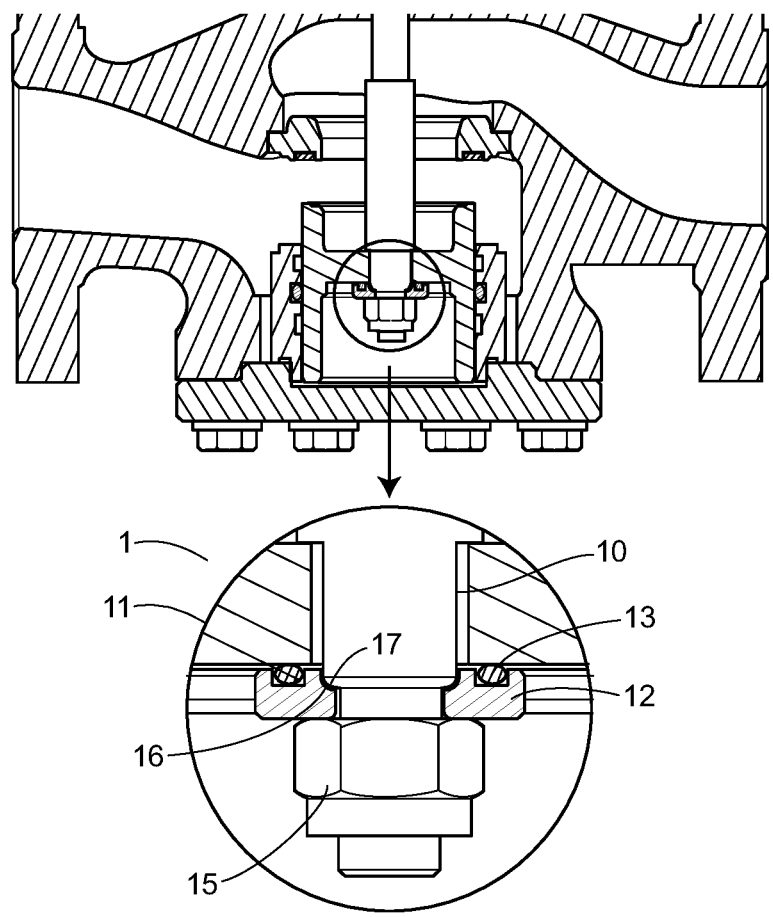
FIG. 1 illustrates one example of a valve stem and valve core assembly constructed in accordance with the teachings of the present invention.

One aspect of the present invention provides a valve stem and valve core assembly 1. As shown in FIG. 1, the valve stem and valve core assembly 1 comprises a valve stem 10, a valve core 11, and an adjusting device 12. The valve core 11 and the adjusting device 12 sleeve the valve stem 10. The adjusting device 12 is located on the upper side or the lower side of the valve core 11. The assembly 1 also includes an elastic element 13 arranged between the adjusting device 12 and the valve core 11. The adjusting device 12 or the valve core 11 is provided with a groove for containing the elastic element 13. The elastic element 13 can, for example, be made of rubber. Since the valve core 11 and the adjusting device 12 sleeve the valve stem 10, both the valve core 11 and the adjusting device 12 are provided with a center hole, wherein the inner diameter of the contact part where the valve core is in contact with the valve stem is slightly larger than the outer diameter of the valve stem, so that the contact parts of the valve core and the valve stem enable a radial clearance. The elastic element 13, which is arranged between the valve core 11 and the adjusting device 12, enables the contact parts of the valve core 11 and the adjusting device 12 to have an axial clearance. The radial clearance and the axial clearance can enable the valve core 11 to move relative to the valve stem 10.

Figure 2:
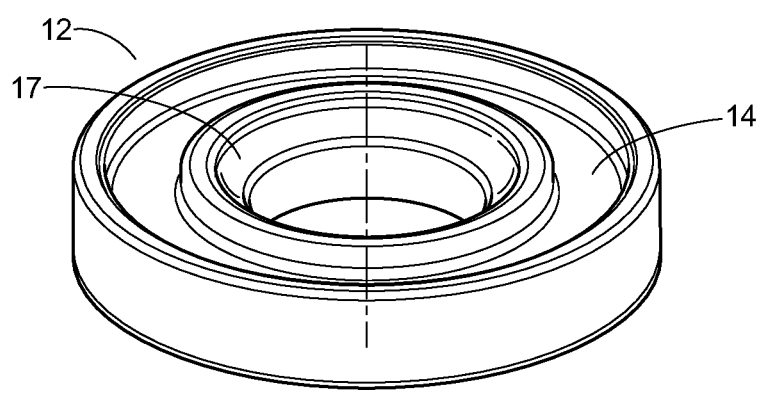
FIG. 2 illustrates one example of the adjusting device of the valve stem and valve core assembly of FIG. 1.

When the adjusting device 12 is located on the lower side of the valve core 11, as shown in FIG. 1 and FIG. 2, the adjusting device 12 is provided with a first groove 14, and the elastic element 13 is nested in the first groove 14 and keeps the axial clearance between the valve core 11 and the adjusting device 12. When the valve core 11 is subjected to a downward extrusion force, the elastic element 13 can properly buffer the pressure of the valve core 11. The first groove 14 can be an annular groove which surrounds the valve stem 10. The valve stem and valve core assembly 1 further includes a fastening piece 15, which sleeves the valve stem 10 and is located below the adjusting device 12, to fix the adjusting device 12 on the valve stem 10.

Similarly, when the adjusting device 12 is located on the upper side of the valve core, the elastic element 13 is arranged between the adjusting device 12 and the valve core 11, and the adjusting device 12 or the valve core 11 is provided with a first groove for containing the elastic element 13.

The valve core 11 can, for example, be a piston or a clack valve.

The valve stem 10 can also be stepped, with a step part 16 arranged on the surface thereof. A convex part 17 can be correspondingly arranged on the inner wall of the center hole of the adjusting device 12, such that the step part 16 of the valve stem can be supported on the convex part 17, which further fixes the adjusting device 12 in place (in combination with the fastening piece 15).

Optionally, the first groove 14 can also be arranged in the contact part where the valve core is in contact with the adjusting device 12, and the elastic element can be nested in the first groove 14 in the valve core 11 so as to keep the axial clearance between the valve core 11 and the adjusting device 12. Similarly, the first groove 14 can be an annular groove which surrounds the valve stem 10 and can also be a non-continuous multi-section groove, with the elastic element 13 having a corresponding shape for nesting in the first groove.

Optionally, the adjusting device 12 or the valve core 11 can be provided with a plurality of grooves, such as a second groove, and the elastic element 13 can be arranged in the second groove. The second groove can, for example, be a continuous annular groove or a section groove.

Optionally, the inner surface of the adjusting device 12 can be provided with a thread, and the adjusting device can be screwed and fixed on the valve stem 10, thereby playing the role of the above mentioned fastening piece.

Example 2

Figure 3:
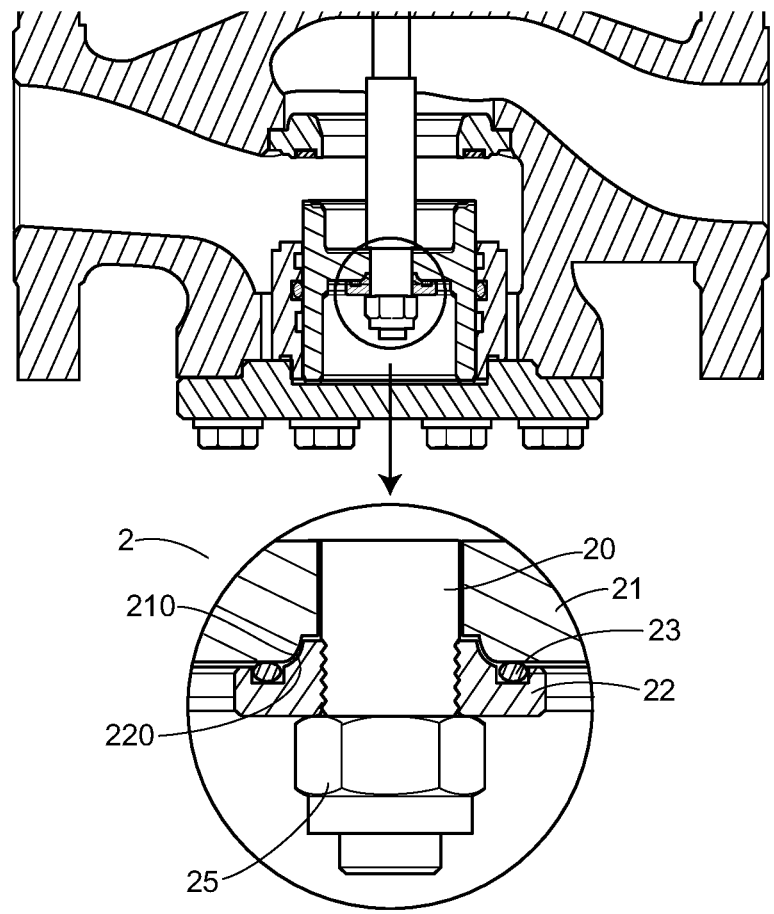
FIG. 3 illustrates another example of a valve stem and valve core assembly constructed in accordance with the teachings of the present invention.

Another aspect of the present invention provides a valve stem and valve core assembly 2. As shown in FIG. 3, the valve stem and valve core assembly 2 comprises a valve stem 20, a valve core 21, and an adjusting device 22. The valve core 21 and the adjusting device 22 sleeve the valve stem 20, and the adjusting device 22 is located on the upper side or the lower side of the valve core 21. The assembly 2 also includes an elastic element 23 arranged between the adjusting device 22 and the valve core 21. The adjusting device 22 or the valve core 21 is provided with a groove, and the elastic element 23 is nested in the groove. The elastic element 23 can, for example, be made of rubber. Since the valve core 21 and the adjusting device 22 sleeve the valve stem 20, both the valve core 21 and the adjusting device 22 are provided with a center hole. The inner diameter of the contact part where the valve core 21 is in contact with the valve stem 20 is slightly larger than the outer diameter of the valve stem 20, so that the contact parts of the valve core and the valve stem enable a radial clearance. The elastic element 23, which is arranged between the valve core 21 and the adjusting device 22, enable the contact parts of the valve core 21 and the adjusting device 22 to have an axial clearance. The radial clearance and the axial clearance enable the valve core 21 to move relative to the valve stem 20.

Figure 4:
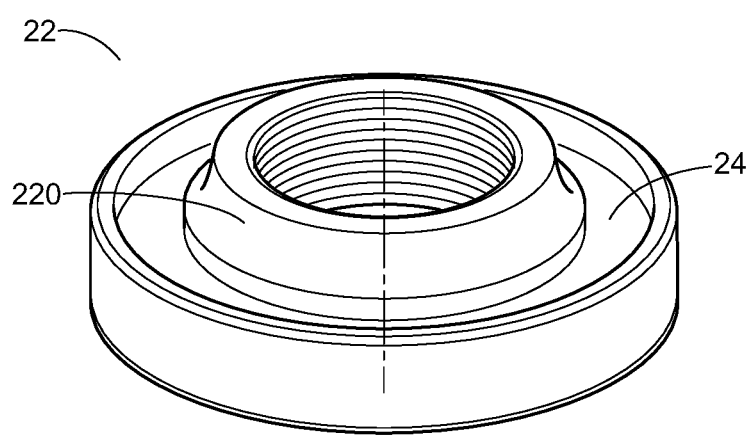
FIG. 4 illustrates another example of the adjusting device of the valve stem and valve core assembly of FIG. 3.

Preferably, when the adjusting device 22 is located on the lower side of the valve core 21, as shown in FIG. 3 and FIG. 4, the adjusting device is provided with a first groove 24, and the elastic element 23 is nested in the first groove 24 and keeps the axial clearance between the valve core and the adjusting device. When the piston 21 is subjected to a downward extrusion force, the elastic element 23 can properly buffer the pressure of the valve core 21. The first groove 24 can, for example, be an annular groove which surrounds the valve stem 20. The valve stem and valve core assembly 2 further includes a fastening piece 25, which sleeves the valve stem 20 and is located below the adjusting device 22, to fix the adjusting device 22 on the valve stem 20.

Similarly, when the adjusting device 22 is located on the upper side of the valve core 21, the elastic element 23 is arranged between the adjusting device 22 and the valve core 21, and, further, the adjusting device 22 or the valve core 21 is provided with a first groove for containing the elastic element 23.

Further, a convex part 220 is additionally arranged on the adjusting device 22. The convex part 220 is in contact with the valve stem 20 and the valve core 21. A concave part 210 is correspondingly arranged on the valve core 21, and the convex part 220 of the adjusting device 22 is fitted with the concave part 210. Specifically, the valve core 21 and the convex part 220 on the adjusting device are concentrically fitted, i.e., the center axes of the valve core 21 and the convex part 220 of the adjusting device 22 are co-axial with the axis of the valve stem 20. The contact between the convex part 220 and the concave part 210 can be via linear contact, arc surface contact, conical surface contact, etc. In any event, such a design provides for a more flexible adjustment of the relative positions of the valve core 21 and the valve stem 20.

Optionally, a convex part can be arranged on the valve core 21, the convex part can be contact with the valve stem 20 and the adjusting device 22, and a concave part can be correspondingly arranged on the adjusting device 22 and fitted with the concave part. Specifically, the adjusting device 22 and the convex part on the valve core 21 can be concentrically fitted, i.e., the center axes of the adjusting device 22 and the convex part of the valve core 21 can be co-axial with the axis of the valve stem 20. The contact between the convex part and the concave part can be via linear contact, arc surface contact, conical surface contact, etc. In any event, such a design provides for a more flexible adjustment of the relative positions of the valve core 21 and the valve stem 20.

When the valve core 21 moves relative to the valve stem 20, due to the existence of the adjusting device 22, the lateral bending force of the valve stem 20 can be further eliminated.

The valve core 21 can, for example, be a piston or a clack valve.

In addition, the valve stem 20 can also be stepped, with a step part arranged on the surface thereof. A convex part can be correspondingly arranged on the inner wall of the adjusting device 22, such that the step part of the valve stem 20 can be supported on the convex part, which further fixes the adjusting device 22 in place (in combination with the fastening piece 25).

Optionally, the first groove 24 can also be arranged in the contact part where the valve core 21 is in contact with the adjusting device 22, and the elastic element 23 can be nested in the first groove 24 in the valve core 21 so as to keep the axial clearance between the valve core 21 and the adjusting device 22. Similarly, the first groove 24 can be an annular groove which surrounds the valve stem 20 and can also be a non-continuous multi-section groove, with the elastic element 23 correspondingly assembled in the first groove 24.

Optionally, the first groove 24 can be a non-continuous multi-section groove, and the elastic element 23 can have a corresponding shape for nesting in the first groove 24.

Optionally, the adjusting device 22 or the valve core 21 can be provided with a plurality of grooves, such as a second groove, and the elastic element 23 can be arranged in the second groove. The second groove can, for example, be a continuous annular groove or a section groove.

Optionally, the inner surface of the adjusting device 22 can be provided with a thread, and the adjusting device 22 can be screwed and fixed on the valve stem 20 by the thread to replace the above mentioned fastening piece 25.

Example 3

Another aspect of the present invention provides a valve. The valve includes the valve stem and valve core assembly 1 or the valve stem and valve core assembly 2 described above. The valve further includes a valve port. One end of the valve stem and the valve core pass through the valve port, the valve core sleeves one end of the valve stem, the valve core moves under the drive of the valve stem, and when the valve core is in full contact with the valve port, the valve port is closed.

The adjusting device of the valve sleeves the valve stem and is located on the upper side or the lower side of the valve core, and an elastic element is arranged between the valve core and the adjusting device. The elastic element is located in a groove in the valve core or the adjusting device.

Due to the existence of the adjusting device and the elastic element, an axial clearance exists between the valve core and the adjusting device, and since the inner diameter of the valve core is larger than the outer diameter of the valve stem, a radial clearance exists between the valve stem and the valve core. The axial clearance and the radial clearance enable the valve core to move, relative to the valve stem, to adjust its position according to different situations in the valve closing process. In this manner, the valve core fully fits with the valve port, thereby improving valve closing performance.

Further, a convex part is arranged on the contact part where the adjusting device is in contact with the valve stem, a concave part is correspondingly arranged on the valve core. The convex part is fitted in the concave part, and the valve core and the convex part are concentrically fitted. Optionally, a convex part can be arranged on the contact part where the valve core is in contact with the valve stem, and a concave part can be correspondingly arranged on the adjusting device, with the convex part fitted in the concave part and the adjusting device and the convex part concentrically fitted. Such a design further enables the valve core to more flexibly move relative to the valve stem during valve port closing, thereby improving the valve closing performance.

Optionally, the adjusting device of the valve of this example can also be arranged inside the valve core, and the elastic element can be arranged between the contact parts of the valve core and the adjusting device. This allows the valve core to be adjusted. The valve core can, for example, be a piston or a clack valve.

During the production of the valve, higher machining precision and tolerance fit quality are not required, yet a good closing performance is achieved and the cost is greatly reduced.

The valve described herein can, for example, be a voltage regulator, a back-pressure valve, or a control valve with pressure which is controlled, sensed and regulated by other electronic sensing elements.

Although terms such as first, second and third can be used to describe various components, parts or portions, these components, parts or portions shall not be limited by these terms; and these terms are only used for distinguishing a component, part or portion. When ordinal numerical terms such as "first", "second" among others, are used herein, they do not contain sequences or orders, unless otherwise clearly stated in the context.

The examples described above are only preferred examples of the present invention and are not used for limiting the protection scope of the present invention. Any amendment, equivalent replacement, improvement, etc., which are made within the spirit and principle of the present invention, shall be included in the protection scope of the present invention.

The invention claimed is:

1. A valve, comprising:
   a valve body defining an inlet, an outlet, and a valve port disposed between the inlet and the outlet;
   a valve stem and valve core assembly comprising:
   a valve stem;
   a valve core sleeving the valve stem, the valve core movably disposed within the valve body relative to the valve port;
   an adjusting device sleeving the valve stem and housed entirely within the valve core, the adjusting device comprising an outer wall, an inner wall defining an opening sized to receive the valve stem, and a groove defined between the outer and inner walls;
   an elastic element arranged between the adjusting device and the valve core, the elastic element arranged in the groove of the adjusting device such that the elastic element contacts both the adjusting device and the valve core to maintain axial clearance between the adjusting device and the valve core; and
   a gap between the valve core and the valve stem such that the valve core is movable relative to the valve stem.

2. The valve according to claim 1, wherein the adjusting device comprises a convex surface arranged in contact with a concave surface of the valve stem.

3. The valve according to claim 1, wherein the valve core comprises a convex surface arranged in contact with a concave surface of the adjusting device.

4. The valve according to claim 1, wherein the groove is a continuous annular groove which surrounds the valve stem, and the elastic element is an O-ring.

5. The valve according to claim 1, wherein the adjusting device is fixed on the valve stem by a nut.

6. The valve according to claim 2, wherein the valve core and the convex part of the adjusting device are concentrically fitted with one another.

7. The valve according to claim 3, wherein the adjusting device and the convex part of the valve core are concentrically fitted.

8. The valve according to claim 1, wherein the inner wall of the adjusting device comprises a thread to threadingly fix the adjusting device on the valve stem.

9. A valve, comprising:
   a valve body defining a valve port;
   an end flange removably coupled to the valve body such that a portion of the end flange is disposed outside of the valve body; and
   a valve stem and valve core assembly comprising:
   a valve stem;
   a valve core sleeving the valve stem, the valve core movable between an open position and a closed position, the valve core having a first end and a second end, the first end arranged to sealingly and directly engage the valve port when the valve core is in the closed position, the second end arranged to directly engage a portion of the end flange when the valve core is in the open position;
   an adjusting device sleeving the valve stem; and
   an elastic element arranged between the adjusting device and the valve core;
   wherein one end of the valve stem and the valve core pass through the valve port, the valve core being movable relative to the valve port responsive to movement of the valve stem, the valve core configured to sealingly engage the valve port, thereby closing the valve port.

10. The valve according to claim 9, wherein the valve core of the valve comprises a piston or a clack valve.

11. The valve according to claim 9, wherein the adjusting device or the valve core is provided with a groove and the elastic element is fitted in the groove.

12. The valve according to claim 9, wherein the adjusting device comprises a convex surface arranged in contact with a concave surface of the valve stem.

13. The valve according to claim 9, wherein the valve core comprises a convex surface arranged in contact with a concave surface of the adjusting device.

14. The valve according to claim 11, wherein the groove is a continuous annular groove which surrounds the valve stem, and the elastic element is an O-ring.

15. The valve according to claim 11, wherein the adjusting device comprises an outer wall and an inner wall defining an opening sized to receive the valve stem, the groove being defined between the outer and inner walls.

16. The valve according to claim 9, further comprising a gap between the valve core and the valve stem such that the valve core is movable relative to the valve stem.

17. The valve according to claim 9, further comprising a fastener arranged to fix the adjusting device on the valve stem, the fastener housed entirely within the valve core.

18. The valve according to claim 9, wherein the adjusting device is housed entirely within the valve core.

19. The valve according to claim 9, wherein the end flange is removably coupled to the valve body via a plurality of fasteners.

20. A valve stem and valve core assembly for use with a control valve, the assembly comprising:
   a valve stem;
   a valve core sleeving the valve stem, the valve core comprising a cylindrical wall;
   an adjusting device sleeving the valve stem, the adjusting device surrounded by the cylindrical wall and housed entirely within the valve core;
   an elastic element arranged between the adjusting device and the valve core, wherein the elastic element contacts both the adjusting device and the valve core to maintain axial clearance between the adjusting device and the valve core;
   a gap between the valve core and the valve stem such that the valve core is movable relative to the valve stem,
   wherein the cylindrical wall has a first end and a second end opposite the first end, and wherein the valve core further comprises a base portion arranged between the first and second ends and surrounded by the cylindrical wall, the base portion defining an opening sized to receive the valve stem, the adjusting device seated against a portion of the base portion; and
   a fastener arranged to fix the adjusting device on the valve stem, wherein the adjusting device is arranged entirely between the fastener and the base portion of the valve core.

* * * * *